US007506567B2

(12) United States Patent
Simokovic (10) Patent No.: US 7,506,567 B2
(45) Date of Patent: Mar. 24, 2009

(54) UNIVERSAL WINDOW BLIND TRIMMER WITH DOUBLE CAMMING

(76) Inventor: Zlatan Simokovic, 7 Fawnridge Trail, Scarborough, Ontario (CA) M1C 4Y9

( * ) Notice: Subject to any disclaimer, the term of this patent is extended or adjusted under 35 U.S.C. 154(b) by 285 days.

(21) Appl. No.: 11/601,933

(22) Filed: Nov. 20, 2006

(65) Prior Publication Data

US 2008/0115646 A1   May 22, 2008

(51) Int. Cl.
*B23D 5/16* (2006.01)
(52) U.S. Cl. .............................. 83/196; 83/554; 83/602; 29/24.5
(58) Field of Classification Search .................. 83/196, 83/198–200, 554, 559, 483–485; 29/24.5
See application file for complete search history.

(56) References Cited

U.S. PATENT DOCUMENTS

| | | | | |
|---|---|---|---|---|
| 2,789,639 A * | 4/1957 | Lorentzen | ........................ | 83/13 |
| 3,391,591 A * | 7/1968 | Funke | ......................... | 83/197 |
| 3,451,297 A * | 6/1969 | Reis et al. | ...................... | 83/198 |
| 3,513,740 A * | 5/1970 | Burghart | ...................... | 83/196 |
| 3,664,221 A * | 5/1972 | Breetvelt | ..................... | 83/196 |
| 5,142,958 A * | 9/1992 | Nordlin et al. | ................. | 83/559 |
| 5,791,222 A * | 8/1998 | Micouleau | .................... | 83/375 |
| 5,816,126 A * | 10/1998 | Pluber | .......................... | 83/167 |
| 5,927,172 A * | 7/1999 | Wang | ........................... | 83/454 |
| 6,089,134 A * | 7/2000 | Marocco | ....................... | 83/197 |
| 6,167,789 B1 * | 1/2001 | Daniels et al. | .................. | 83/13 |
| 6,314,851 B1 * | 11/2001 | Graves et al. | .................. | 83/553 |
| 6,553,878 B2 * | 4/2003 | Gosis et al. | ..................... | 83/13 |
| 6,758,120 B2 * | 7/2004 | Marocco | ....................... | 83/52 |
| 6,877,409 B2 * | 4/2005 | Huang et al. | .................... | 83/52 |
| 7,107,889 B2 * | 9/2006 | Marocco | ....................... | 83/198 |
| 7,124,672 B2 * | 10/2006 | Marocco | ....................... | 83/197 |
| 2002/0029674 A1 * | 3/2002 | Graves et al. | .................. | 83/196 |
| 2002/0062723 A1 * | 5/2002 | Marocco | ........................ | 83/13 |
| 2003/0070515 A1 * | 4/2003 | Huang et al. | .................... | 83/13 |
| 2005/0150337 A1 * | 7/2005 | Cheng | .......................... | 82/101 |
| 2005/0150344 A1 * | 7/2005 | Nien et al. | ..................... | 83/651 |
| 2005/0188801 A1 * | 9/2005 | Marocco | ......................... | 83/13 |
| 2006/0107812 A1 * | 5/2006 | Marocco | ....................... | 83/198 |
| 2008/0115646 A1 * | 5/2008 | Simokovic | .................... | 83/588 |

* cited by examiner

*Primary Examiner*—Kenneth E. Peterson
*Assistant Examiner*—Sean Michalski
(74) *Attorney, Agent, or Firm*—David W. Wong (57) ABSTRACT

A universal window blind trimmer is provided with an interchangeable die assembly. Each die assembly has a window blind head rail receiving opening and window blind bottom rail receiving opening of a different size and shape such that it may be used for trimming a wide variety of window blinds. A double action cam pivotable by a handle is operative for trimming the head rail and bottom rail when the handle is pivoted in one direction and cutting a bundled of window blind slats when the handle is pivoted in another direction.

12 Claims, 6 Drawing Sheets

UNIVERSAL WINDOW BLIND TRIMMER WITH DOUBLE CAMMING

BACKGROUND OF THE INVENTION

1. Field of the Invention

This invention relates to a window blind trimmer and more specifically to a universal trimmer which is capable of trimming a wide variety of window blinds.

2. Background Art

Window blinds are the most popular and economical means for dressing a window. They provide an ergonomical and pleasant covering for windows. Window blinds commonly consist of a plurality of horizontal slats mounted between a top head rail and a bottom rail by a plurality of vertical cords threaded through openings formed in the slats. Two of the cords located adjacent to the two sides of the blind commonly provide a pull cord adapted to a pulley mechanism such that they are operative for raising the slats and the bottom rail to bundle the slats beneath and adjacent to the top head rail so as to open the blind, or lowering the slats to position evenly spaced from one another horizontally over the window. The slats may also be turned horizontally to either close or open the spacing between them whereby to close or open respectively the view through the window. The slats are made in a variety of materials such as plastic, wood, fabric, fiber material, or metal. Similarly, the head rail and the bottom rail may also be made in a variety of plastic materials or metals.

Due to the variety of sizes of windows, window blinds are commonly produced in several standard sizes that conform with windows of some standard sizes. For non-standard size windows, a blind slightly larger then the window opening must be custom trimmed by the vendor or installer to fit the window. The vertical length of the blind is trimmed by removing some of the slats from a blind having a longer vertical length than the window opening, while the width of the blinds must be trimmed by cutting off two equal end portions of the head rail, bottom rail and slats from a width longer than the window opening so that the blind may fit inside the window opening. The head rail and the bottom rail are commonly trimmed by inserting individually their ends to be cut into a die provided on a support frame. The die has an openings in the shape and size of the cross sectional shape and size of the head rail and bottom rail and a shear is activated either pneumatically, electrically, or manually to cut off the selected end portions. The slats may then be bundled together with their ends inserted and mounted firmly into the trimmer such that the selected end portions may be trimmed off with an electric rotary saw or pneumatic shear which are also mounted on the support frame.

Due to the wide variety of shapes and sizes and materials of the head rail and bottom rail as well as the slats in the variety of window blinds, it is necessary for the vendor such as a building supply store to equip with a plurality of trimming machines with each machine dedicated for cutting a different variety of blind. This requires a considerable amount of floor space at the vendor for installing and operating the plurality of trimming machines whereas vendor's floor space is always at a minimum in order the maximum amount of floor space may be used to accommodate a maximum amount of merchandise.

SUMMARY OF THE INVENTION

It is a principal object of the present invention to provide a window blind trimming machine which is operative for trimming window blinds having head rails, bottom rails and slats of a wide variety of shapes and sizes and made of a wide variety of materials.

It is another object of the present invention to provide a window blind trimming machine which is simple in structure and requires very little space for installation.

It is another object of the present invention to provide a window blind trimming machine which is easy to operate.

It is yet another object of the present invention to provide a window blind trimming machine which may be installed in a truck for a window blind installer to use on site for trimming a window blinds of different shapes and sizes and made of a wide variety of materials.

BRIEF DESCRIPTION OF THE DRAWINGS

Other objects and advantages of the present invention will become apparent from the following detailed description of the preferred embodiments thereof in connection with the accompanying drawings, in which.

DETAILED DESCRIPTION OF THE PREFERRED EMBODIMENTS

Figure 1:
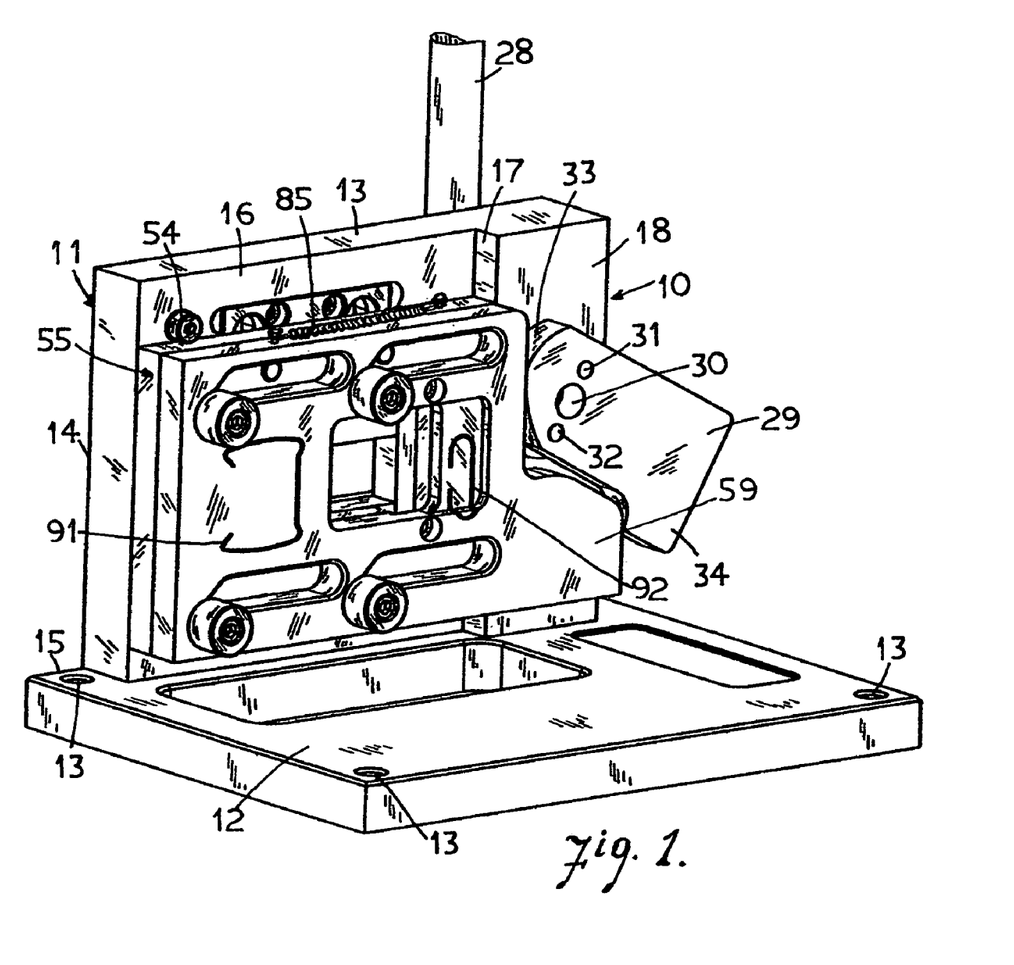
FIG. 1 is a perspective top and front elevation view of the window blind trimming machine according to the present invention.
Figure 2:
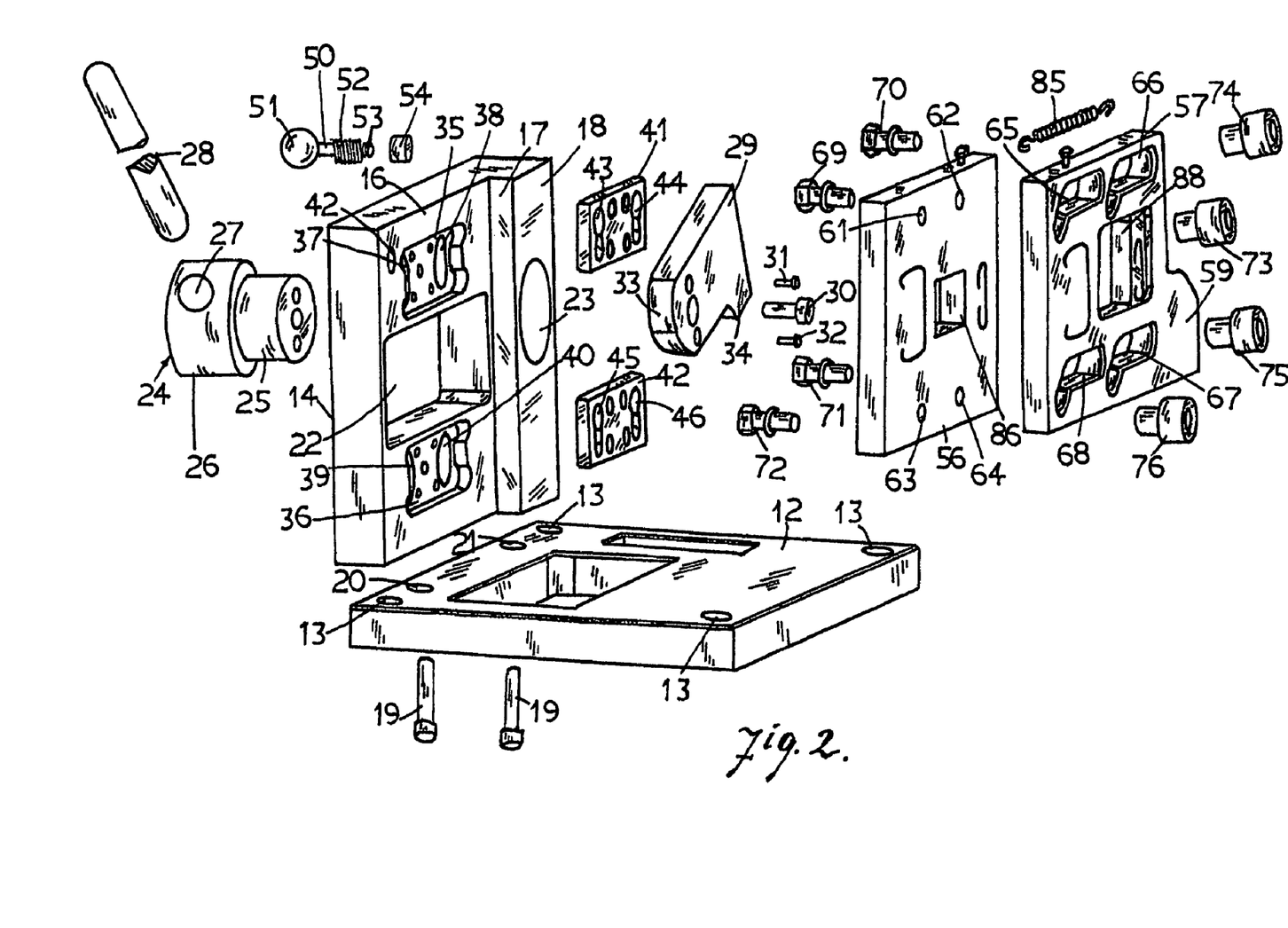
FIG. 2 is an exploded perspective elevation view of the window blind trimming machine of the present invention showing the various component parts thereof.
Figure 3:
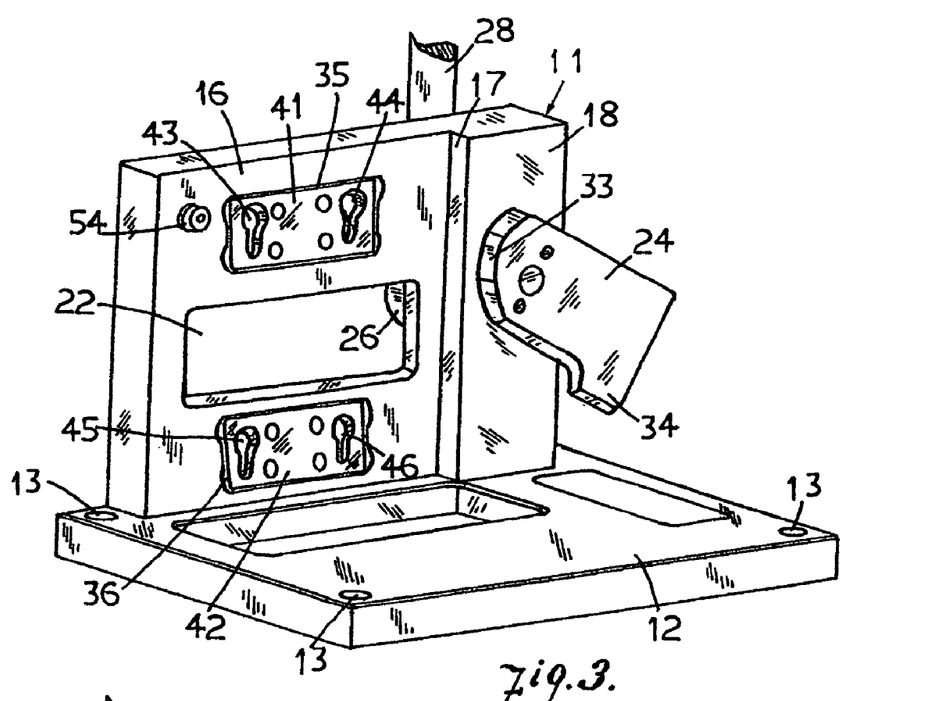
FIG. 3 is a perspective top and front elevation view of the mounting frame thereof.
Figure 4:
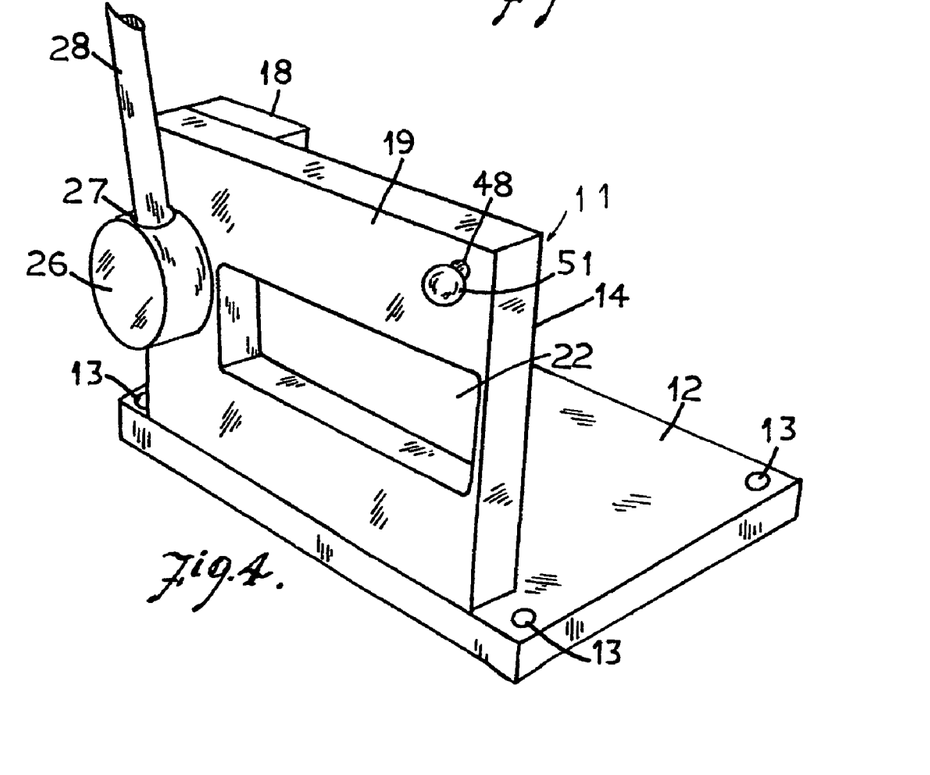
FIG. 4 is a perspective top and rear elevation view of the mounting frame thereof.

With reference to the drawings in which like reference numerals designate corresponding parts in the several views, the blind trimmer machine 10 of the present invention has a main mounting frame 11 consisting of a rectangular support base plate 12 which is provided with mounting openings 13 at its four corners such that it may be securely mounted with mounting bolts on a work bench if required. A rectangular die holder plate 14 is mounted vertically along a rear edge 15 of the base plate 12 and extending perpendicularly upward therefrom. The die holder plate 14 has a recessed rectangular surface portion 16 formed in its front portion such that a step 17 is provided between its front portion and a rectangular rear raised platform 18. The die holder plate 14 may be mounted to the support base plate 12 with bolts 19 extending through openings 20 and 21 formed in the support base plate 12 as best shown in FIG. 2. A rectangular slats receiving opening 22 is formed in the middle portion of the recessed rectangular surface portion 16. A circular opening 23 is formed in the rectangular rear raised platform 18 of the die holder plate 14. A rotatable shaft 24 having a short cylindrical portion 25 adapted for rotatably mounted within the circular opening 23 of the rectangular raised platform 18 of the die holder plate 14, and a circular outer portion 26 having a diameter larger than the cylindrical portion 25 and positioned juxtaposed the die holder plate 14. An opening 27 is formed in the side wall of the circular outer portion 26. An elongated pivot handle 28 is mounted to the circular outer portion 26 through the opening 27 such that it is operative for turning the rotatable shaft 24 relative to the die holder plate 14.

A generally reverse L-shaped double action cam arm 29 is mounted to the end of the cylindrical portion 25 of the rotatable shaft 24 with bolts 30, 31 and 32 and it lies in abutment with the surface of the rectangular rear portion 18 of the die holder plate 14. The double action cam arm 29 has a generally rounded cam edge surface 33, and the mounting to the rotatable shaft 24 is located adjacent to this rounded cam edge surface 33. The reverse L-shaped end portion 34 is located distal to the mounting to the rotatable shaft 24.

Two rectangular depressions 35 and 36 are formed in the recessed surface portion 16 of the die holder plate 14. The depression 35 is located above the slat receiving opening 22 and the depression 36 is located below the slat receiving opening 22 respectively. Two vertical oval shaped depressions 37 and 38 are formed in the depression 35 and similarly two vertical oval shaped depressions 39 and 40 are formed in the depression 36.

Two rectangular retainer plates 41 and 42 are mounted within the depressions 35 and 36 respectively. Two vertical key slots 43 and 44 are formed in the retainer plates 41 and similarly two vertical key slots 45 and 46 are formed in the retainer plate 42. Each one of the key slots 43, 44, 45 and 46 has a rounded upper opening and a straight slot lower opening. The key slots 45 and 46 are aligned with the oval depressions 37 and 38 respectively, similarly the key slots 45 and 46 are aligned with the depressions 39 and 40 respectively.

A circular depression 47 is formed adjacent to the upper outer corner of recessed surface portion 16 of the die holder plate 14, and an opening 48 is formed in the rear surface 49 of the die holder plate 14. The opening 48 is in communication with the circular depression 47 but has a smaller diameter than the latter. A retractable rod 50 having the diameter equal to that of the opening 48 is slidable mounted within the opening 48. A knob 51 is mounted on the rod 50 and located juxtaposed to the rear surface 49 of the die holder plate 14. A spiral compression spring 52 having a diameter equal to that of the circular opening 47 is mounted on the free end 53 of the rod 50 and located within the circular depression 47. A rotatable wheel 54 is mounted at the free end 53 of the retractable rod 50. The rotatable wheel 54 has a diameter and length equal to the diameter and depth of the circular depression 47 such that the retractable rod 50 may be operated by pulling the knot 51 to retract the rotatable wheel 54 to lie flush within the circular depression 47.

Figure 5:
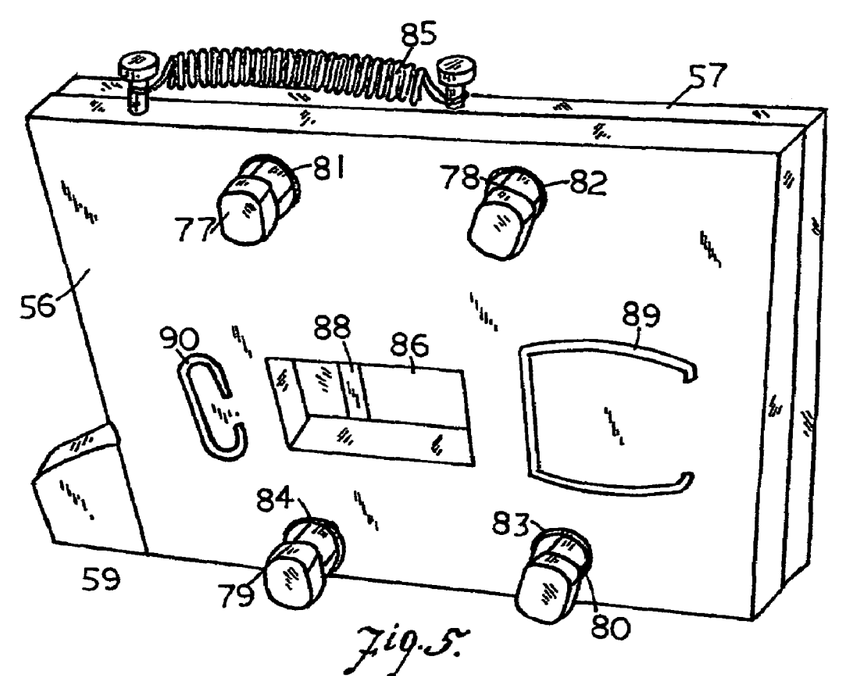
FIG. 5 is an enlarged perspective rear elevation view of the interchangeable die assembly of the trimming machine of the present invention.
Figure 6:
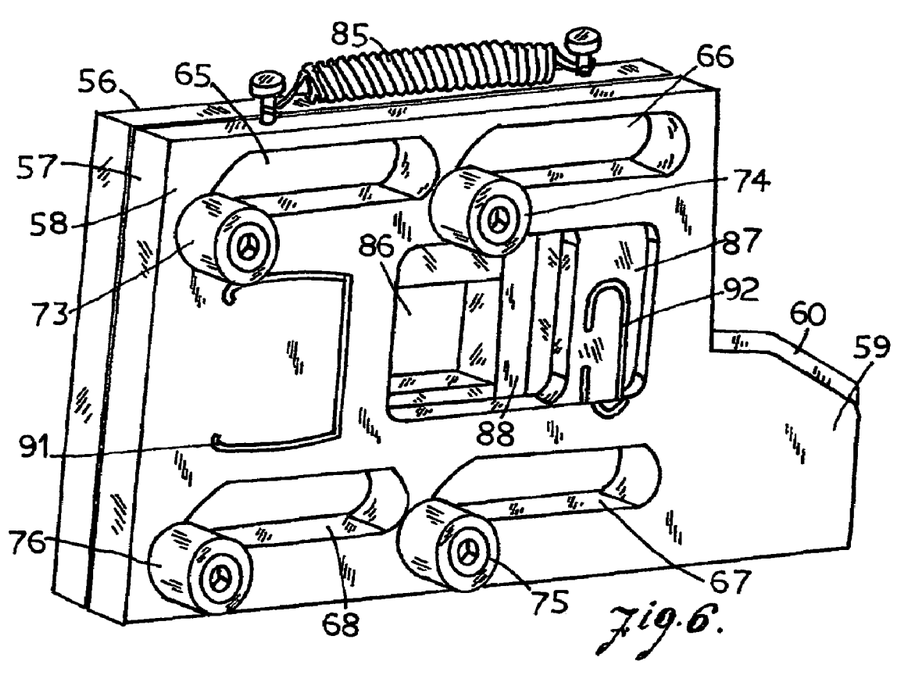
FIG. 6 is an enlarged perspective front elevation view of the interchangeable die assembly of the trimming machine of the present invention.

An interchangeable die assembly 55 is removably mounted to the die holder plate 14. The die assembly 55 has a rectangular inner plate 56 having thickness and length generally equal to the depth and length of the recessed rectangular recessed portion 16 of the die holder plate 14, and an outer slider plate 57 having a main rectangular body portion 58 equal in dimensions to the inner plate 56 and a extension cam portion 59 extending outwards from its lower rear corner portion. The extension cam portion 59 has a sloping upper edge 60. Four mounting openings 61, 62, 63 and 64 are formed in the inner plate 56 as best shown in FIG. 2. Four horizontal reverse L-shaped guide slots 65, 66, 67 and 68 are formed in the outer slider plate 57. The inner plate 56 and the outer slider plate 57 are removably mounted together with four retainer bolts 69, 70, 71 and 72 and four generally T-shaped cylindrical nuts 73, 74, 75 and 76 respectively. Each of the retainer bolts 69, 70, 71 and 72 has a head portion 77, 78, 79 and 80 respectively formed at its free end, a circular ring 81, 82, 83 and 84 formed in the middle portion of its longitudinal body and threaded end portion respectively. The body of the retainer bolts 69, 70, 71 and 72 has a diameter equal to that of the mounting openings 61, 62, 63 and 64. The inner plate 56 and the outer slider plate 57 are removably mounted together with the threaded end portion of the retainer bolts 69, 70, 71 and 72 inserting through the mounting openings 61, 62, 63 and 64 respectively to engage with the T-shaped cylindrical nuts 73, 74, 75 and 76 inserting through the horizontal reverse L-shaped guide slots 65, 66, 67 and 68 respectively. The circular rings 81, 82, 83 and 84 cooperate with the T-shaped cylindrical nuts 73, 74, 75 and 76 to mount the inner plate 56 and the outer slider plate 57. The outer slider plate 57 is slidable relative to the inner plate 56 with the T-shaped nuts 73, 74, 75 and 76 slidable along the horizontal reverse L-shaped guide slots 65, 66, 67 and 68 respectively. The head portions 77, 78, 79, 80 extend outwards from the rear surface of the inner plate 56 as best shown in FIG. 5 and they are slightly smaller than the circular portion of the key slots 43, 44, 45 and 46 of the retainer plates 41 and 42. A bias spring 85 is mounted between the inner plate 56 and the outer slider plate 57. The bias spring 85 maintains the inner plate 56 and the outer slider plate 57 at a normal mounted condition with the T-shaped cylindrical nuts 73, 74, 75 and 76 resting against the lower edge of the reverse L-shaped guide slots 65, 66, 67 and 68 respectively as best shown in FIG. 6.

A rectangular slats receiving opening 86 is formed in the inner plate 56 and a similar rectangular slats receiving opening 87 is formed in the outer slider plate 57. The two slats receiving openings 86 and 87 are aligned with one another when the inner plate 56 and outer slider plate 56 are in the mounted normal condition. A vertical cutting blade 88 is formed at the left side edge of the slats receiving opening 87 of the outer slider plate 57.

A large reverse C-shaped opening 89 having the same shape and dimensions as the cross sectional shape and dimensions of a common window blind head rail and a smaller reverse C-shaped opening 90 having same shape and dimensions as the cross sectional shape and dimensions of a common window blind bottom rail are formed on the inner plate 56 and located adjacent to the left and right side of the slats receiving opening 86. A similar large reverse C-shaped opening 91 and smaller reverse C-shaped opening 92 are formed in the outer slider plate 57. The large reverse C-shaped openings 89 and 91 and the smaller reverse C-shaped openings 90 and 92 are aligned with one another when the inner plate 56 and the outer slider plate 57 are in the mounted normal condition.

The interchangeable die assembly 55 may be removably mounted to the main mounting frame 11 by first pulling the rotatably wheel 54 to lie within the circular depression 47 of the main mounting frame 11 such that the die assembly 55 may be pushed onto to the main mounting frame 11 with the head portions 77, 78, 79 and 80 engaging with the circular portion of the key slots 43, 44, 45 and 46 of the retainer plates 41 and 42 and then slidably pushed downward along the lower narrow portion of the key slots to securely mounting the die assembly 55 to the main mounting frame 11. At this mounted position, the rotatable wheel 54 will extend outwards from the circular depression 47 to engage with the top edge of the inner plate 56 to provide a latching means for ascertaining the die assembly 55 being mounted securely to the main mounting frame 11. The die assembly 55 may be removed from the main mounting frame 11 by following the reverse procedure by first pulling the rotatable wheel 54 within the circular depression 47 and then pulling the die assembly 55 upwards to slide the head portions 77, 78, 79 and 90 up to the circular portion of the key slots 43, 44, 45 and 46 such that they may be disengaged from the key slots by pulling the die assembly 55 outwards away from the main mounting frame 11.

Figure 7:
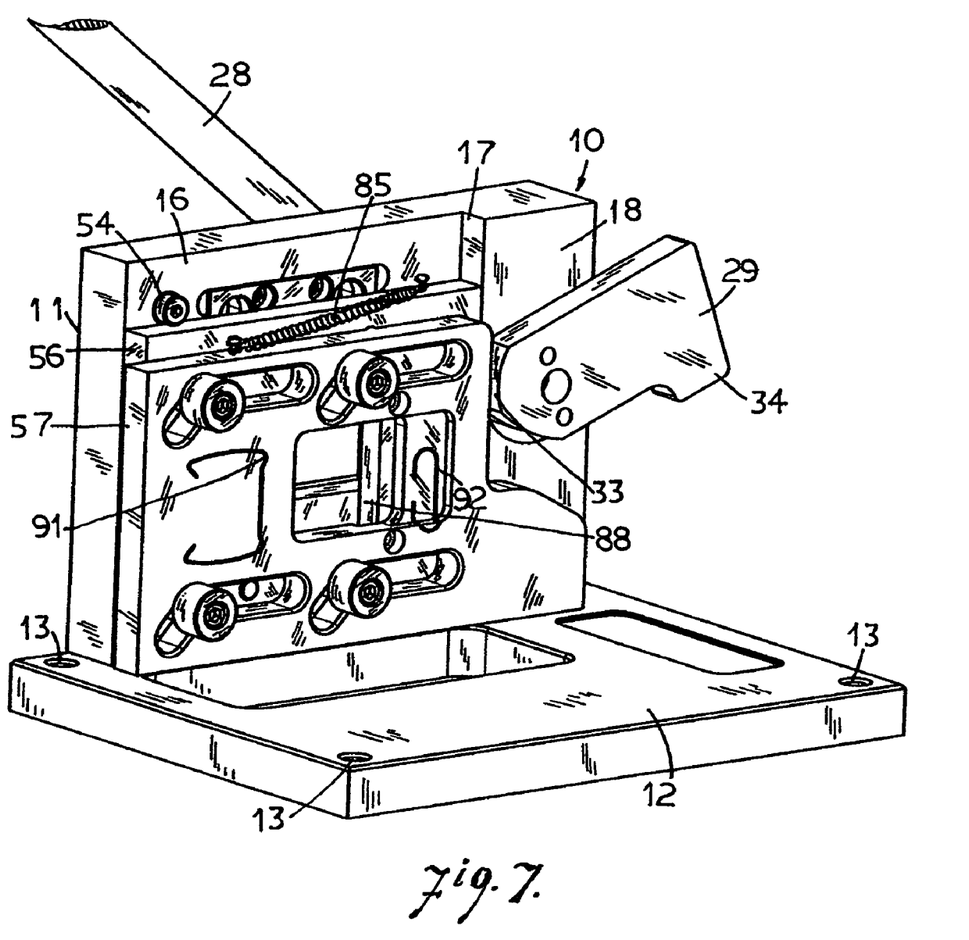
FIG. 7 is a perspective top and front elevation view of the trimming machine operated for cutting the head rail and bottom rail of the window blind.
Figure 8:
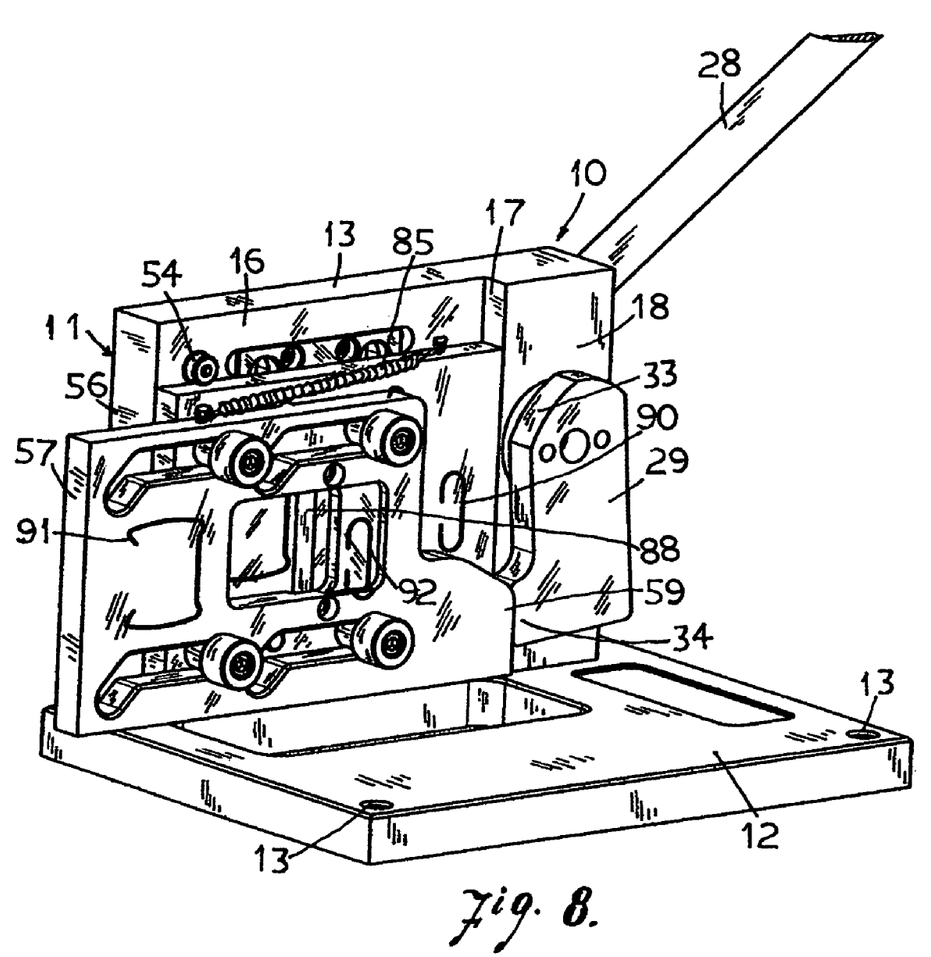
FIG. 8 is a perspective top and front elevation view of the trimming machine operated for cutting the slats of the window blind.

The head rail and the bottom rail of the window blind may be trimmed by inserting them into the aligned large reverse C-shaped openings and smaller reverse C-shaped openings of the inner plate 56 and outer slider plate 57, and then pivoting the handle 28 forwards as shown in FIG. 7 such that the rounded cam edge surface 33 of the double action cam arm 29 will engage the right edge of the outer slider plate 57 to slide it forward relative to the inner plate 56 to shear off the selected end portions of the head rail and the bottom rail. The selected end portions of the slats of the window blind may be trimmed by bundling them together and inserting the bundle into the aligned slats receiving openings 22, 86 and 87 and then pivoting the handle 28 rearwards as shown in FIG. 8 such that the lower L-shaped end portion 34 of the double action cam arm 29 will engage with the right edge of the outer slider plate 57 to push it forward such that the vertical cutting blade 88 will move forward to trim the bundled slats. After the slats have been trimmed the handle 28 may be pivoted back to the vertical normal position, the outer slider plate 57 will be pulled back to the normal position by the bias spring 85.

A plurality of die assembly 55 having large reverse C-shaped opening, smaller reverse C-shaped opening, and slats receiving opening of different shapes and dimensions may be provided such that they be interchangeably mounted to the main mounting frame 11 for trimming different window blinds. Therefore, the single machine of the present invention may be used for trimming a wide variety of window blinds. Also, due to the simple construction, the machine occupies a minimum amount of space in the retail store or it may be carried in a mobile truck for trimming window blinds at the job site.

While the present invention has been shown and described in the preferred embodiments thereof, it will be apparent that various modifications can be made therein without departing from the spirit or essential attributes thereof, and it is desired therefore that only such limitations be placed thereon as are imposed by the appended claim.

What is claimed is:

1. A universal window blind trimmer for trimming a window blind having a head rail, a bottom rail and a plurality of slats, comprising,
    a main mounting frame having a rectangular die holder plate extending upwardly in a perpendicular manner along an edge portion of a support base plate, said die holder plate having a front surface with a rectangular recessed portion and a rectangular raised platform formed therein, said recessed portion and said raised platform being separated by a step,
    a rectangular slats receiving opening formed at a central area of said recessed portion,
    a double action cam arm pivotally mounted on said raised platform,
    an elongated handle coupled to said double action cam arm and operative for pivoting said double action cam arm,
    an interchangeable die assembly removably mounted in said rectangular recessed portion of said die holder plate, said die assembly including an inner plate and an outer slider plate and said outer slider plate being slidable relative said inner plate, said slider plate having an extended cam portion juxtaposed to said double action cam arm,
    a first rectangular opening formed in a central area of said inner plate and being in registry with said rectangular slats receiving opening of said die holder plate, a head rail receiving opening formed in said inner plate and having a shape and size equal to cross sectional shape and size of head rail, and a bottom rail receiving opening formed in said inner plate and having a shape and size equal to cross sectional shape and size of said bottom rail,
    a second rectangular opening formed in a central area of said outer slider plate and being normally in registry with said first rectangular opening of said inner plate, an associated head rail receiving opening and an associated bottom rail receiving opening formed in said outer slider plate, said associated head rail receiving opening and said associated bottom rail receiving opening of said outer slider plate having a shape and size equal to said head rail receiving opening and said bottom rail receiving opening respectively of said inner plate and being normally in registry therewith,
    a cutting blade located at a vertical edge of said second rectangular opening of said outer slider plate.

2. A universal window blind trimmer according to claim 1 including a rotatable wheel mounted on said die holder plate and adapted for retaining said die assembly securely mounted to said die holder plate.

3. A universal window blind trimmer according to claim 2 including a bias spring mounted between said inner plate and said outer slider plate and adapted to maintain said inner plate and outer slider plate in a normal position with said first rectangular opening and said second rectangular opening in registry with said slats receiving opening of said die holder plate.

4. A universal window blind trimmer according to claim 3 wherein said double action cam arm having a generally circular cam edge and a generally L-shaped lower end portion, and said extended cam portion of said double action cam arm being juxtaposed to said L-shaped lower end portion of said double action cam arm.

5. A universal window blind trimmer according to claim 4 wherein said circular cam edge of said double action cam arm abuts a vertical side edge of said outer slider plate and being operative by pivoting said handle to move said outer slider plate slidably sideway relative to said inner plate to displace said first shaped opening from registry with said third shaped opening, as well as displacing said second shaped opening from registry with said fourth shaped opening.

6. A universal window blind trimmer according to claim 5 including two rectangular depressions formed in said recessed portion of said die holder plate and located respective above and below said slats receiving opening, two retainer plates mounted in said depressions, each one of said retainer plates having two vertical key-shaped slots, mounting bolts provided on a rear surface of said inner plate, said mounting bolts having an enlarged head and operative slidably for engaging with said key-shaped slots of said retainer plates for removably mounting said die assembly to said die holder plate.

7. A universal window blind trimmer according to claim 6 wherein said double action cam arm is pivotable for engaging said L-shaped lower end portion with said extended cam portion of said outer slider plate for sliding said outer slider sideway relative to said inner plate for cutting a selected end portion of a bundled slats located within said slats receiving opening and said second rectangular opening of said outer slider plate by said cutting blade.

8. A universal window blind trimmer according to claim 7 including four horizontal reversed L-shaped slots formed in said outer slider plate, and said outer slider plate being slidably mounted to said inner plate with four generally T-shaped nuts extending through said L-shaped slots to engage with a threaded end of said mounting bolts, said outer slider plate being slidable relative to said T-shaped nuts along said L-shaped slots.

9. A universal window blind trimmer according to claim 8 wherein said double action cam arm is mounted on a rotatable shaft rotatably mounted in said raised platform of said die holder plate, and said handle is mounted to said rotatable shaft.

10. A universal window blind trimmer according to claim 9 wherein said rotatable wheel is spring mounted on a pull rod and operative to lie flush within a circular depression formed in said recessed portion of said die holder plate to facilitate mounting and removing said die assembly selectively from said die holder plate.

11. A universal window blind trimmer according to claim 10 wherein said head rail receiving opening and said bottom rail receiving opening have a reverse C shape and are located adjacent to opposite sides of said first rectangular opening of said inner plate, and said associated head rail receiving opening and said associated bottom receiving opening are located adjacent to opposite sides of said second rectangular opening of said other slider plate.

12. A universal window blind trimmer according to claim 11 including a plurality of die assemblies wherein each die assembly has head rail receiving opening, bottom rail receiving, associated head rail receiving opening, and associated bottom receiving opening of different shapes and sizes.

* * * * *